United States Patent [19]

Allured

[11] Patent Number: 4,831,950
[45] Date of Patent: May 23, 1989

[54] WIND PROPELLED APPARATUS

[76] Inventor: Stanley E. Allured, P.O. Box 318, Wheaton, Ill. 60189

[21] Appl. No.: 90,672

[22] Filed: Aug. 28, 1987

[51] Int. Cl.[4] .............................................. B63H 9/00
[52] U.S. Cl. ..................................... 114/39.1; 114/61; 114/95; 280/213; 280/810
[58] Field of Search ....................... 114/39.1, 39.2, 102, 114/103, 43, 61, 95; 441/73; 280/1, 810, 213

[56] References Cited

U.S. PATENT DOCUMENTS

| | | | |
|---|---|---|---|
| 736,386 | 8/1903 | Hansen | 280/213 X |
| 3,742,886 | 7/1973 | Dillon | 114/39.1 X |
| 3,933,110 | 1/1976 | Jamieson | 114/61 X |
| 3,985,597 | 7/1975 | Olevsky | 280/1 |
| 4,130,292 | 12/1978 | Lorenz | 114/39.1 X |
| 4,434,737 | 3/1984 | Weiss | 114/3.2 |
| 4,617,871 | 10/1986 | Yau | 114/39.1 |

FOREIGN PATENT DOCUMENTS

| | | | |
|---|---|---|---|
| 1148587 | 6/1983 | Canada | 280/810 |
| 2649577 | 3/1978 | Fed. Rep. of Germany | 114/61 |
| 1048346 | 12/1953 | France | 114/103 |
| 2545440 | 11/1984 | France | 114/61 |

Primary Examiner—Sherman D. Basinger
Attorney, Agent, or Firm—Burmeister, York, Palmatier, Hamby & Jones

[57] ABSTRACT

A sail propelled vehicle for land or sea in which a triangular yoke is pivotally attached at two of the corners thereof on two pontoons, skis, or skateboards at the forward ends thereof. The mast for carrying the sail is mounted vertically on the yoke at the third corner thereof. The operator is carried on the two pontoons, skis, or skateboards and by exerting force thereon through his feet and legs, the operator can pivot the yoke to position the sail on either side of the pontoons, skis, or skateboards to achieve improved stability, maneuverability and control.

14 Claims, 3 Drawing Sheets

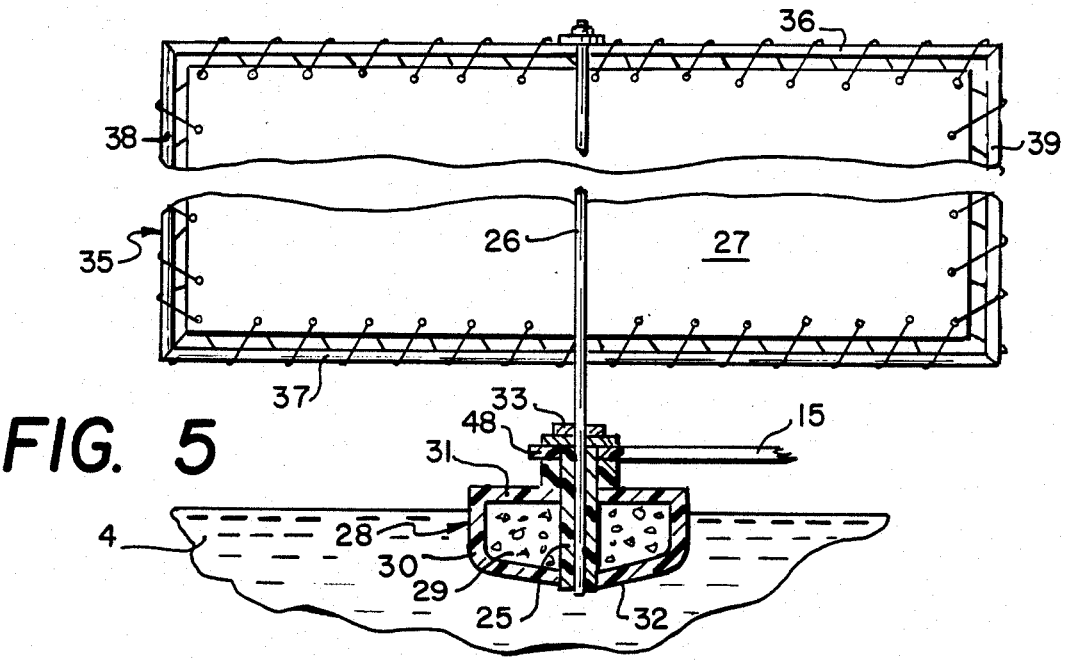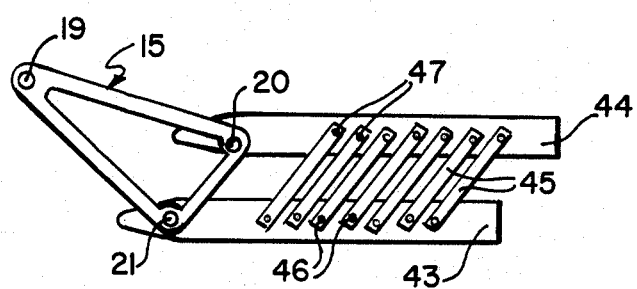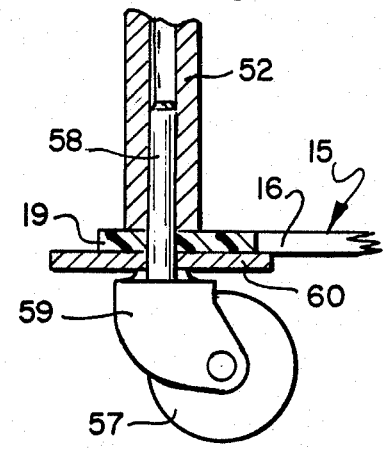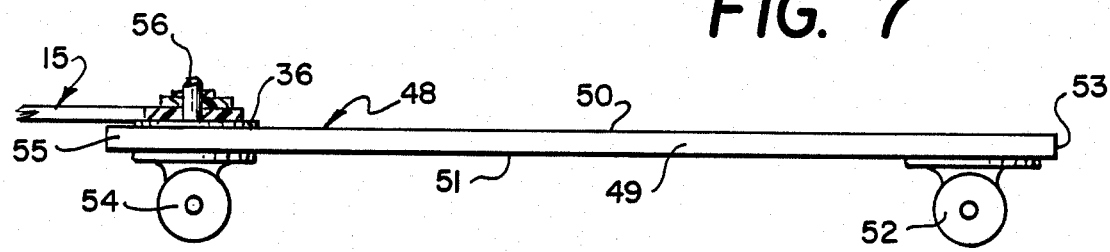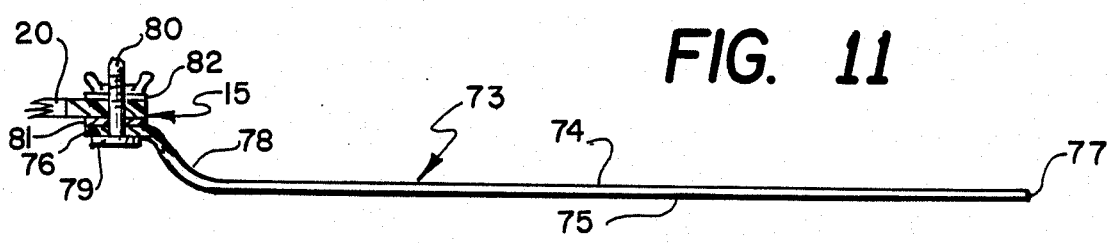

WIND PROPELLED APPARATUS

The present invention relates to wind propelled devices, such as flotation devices for use on water, rolling devices for use on land, and skiing devices for use on snow or ice.

BACKGROUND OF THE INVENTION

At the present time, the only practical method of individual sailing with an easily portable device is windsurfing. This is a popular sport, but requires great effort and considerable skill, and therefore is practiced by relatively few, and generally only by the young and unusually physically fit. One of the purposes of this invention is to provide an easier method of sailing on an individual device that is easily portable, and can be mastered relatively easily, and enjoyed by those with only moderate athletic skill and strength. The most obvious use of this invention is for sailing on water. However, the invention is also adapted to sail-skiing on snow or ice, and sail-boarding/biking on a large flat open area, such as packed sand or a parking lot.

STATEMENT OF INVENTION

The present invention, in the embodiment for use on water, provides a wind propelled apparatus with two floating skis or pontoons to carry the weight of the sailor and of the apparatus. A yoke is attached to the front of the pontoons on which is mounted a mast supporting a sail. The two pontoons are disposed side by side in spaced relation, and the pontoons are joined together at the front by an arm of the yoke providing a fixed distance of separation. The arm of the yoke attaches pivotally to the pontoons, and therefore the pontoons are movable forwardly and backwardly with respect to each other in a generally parallel relation.

The yoke is preferably in the shape of an isosceles triangle, with the arm of unequal length joining the front ends of the pontoons, and the two arms of equal length extending forward from each of the pontoons and meeting at the mast where they are attached to each other.

The sail is mounted on the mast and controlled through lines by the sailer. In a preferred construction, the sail is substantially enclosed by a frame which extends about the perimeter of the sail and holds the sail taut. Lines are attached to opposite sides of the frame and these lines are manipulated by the sailor to adjust the position of the sail with respect to the apparatus and with respect to the wind. These lines also contribute to the operation and stability of the apparatus, as the sailor also uses these lines to balance himself with regard to the apparatus, and to maintain the relative position of the apparatus to the wind and the direction he wishes to go. The force of the wind on the sail is transferred through these lines to the sailor who is holding them, and by his feet to the apparatus, thus providing a substantial proportion of the forward thrust of the apparatus.

In the embodiment described, the sailor will place one of his feet on each of the pontoons, and manipulate the relative position of the pontoons through shifting his weight and pressure from the lines linking him with the sail. However, this invention will work equally well by utilizing a series of slats, pivoted on each end, between the pontoons. In this embodiment, the sailor places his feet anywhere on the platform formed by the slats and performs the same maneuver of changing the relative position of the pontoons to each other through the force from his feet as when his feet were placed directly on the pontoons.

In the course of sailing, the sailor will direct the apparatus by shifting his feet so that the pontoons will change their relative position, which will, due to the design of the yoke, shift the position of the mast from one side of the apparatus to the other.

This is the principle objective of this invention, as this movement of the mast makes a major change in the position of the apparatus relative to the wind and the desired direction of travel. The movement of the mast from one side to the other side of the apparatus and the control of the attitude of the sail by the lines, together gives this apparatus great stability and allows a surprising amount of maneuverability and sailing speed to the apparatus. While the above statement of the invention has been made with respect to water sailing, the invention is also adapted for use on snow or ice, or on land. The floating skis or pontoons used on water are replaced with snow skis or skateboards, as will be described hereafter.

BRIEF DESCRIPTION OF THE DRAWINGS

The present invention, and its objectives and advantages, will be more fully appreciated from the following specification, particularly with reference to the drawings, in which:

FIG. 5 is a sectional view taken along the line 5—5 of FIG. 2;

FIG. 6 is a variation of FIG. 2 with the addition of the platform of slats for the operator to stand on;

FIG. 7 is a side elevational view of a skateboard for use in a wind propelled land transport device utilizing the yoke, mast and sail illustrated in the embodiment of FIGS. 1 through 5;

FIG. 8 is a sectional view of the sail, support for the sail and a portion of the yoke of the land transport devices of FIG. 7;

FIG. 11 is a side elevational view of a ski for a transport device for use in snow and on ice utilizing the yoke, mast and sail illustrated in the embodiment of FIGS. 1 through 5.

DETAILED DESCRIPTION OF INVENTION

Figure 1:
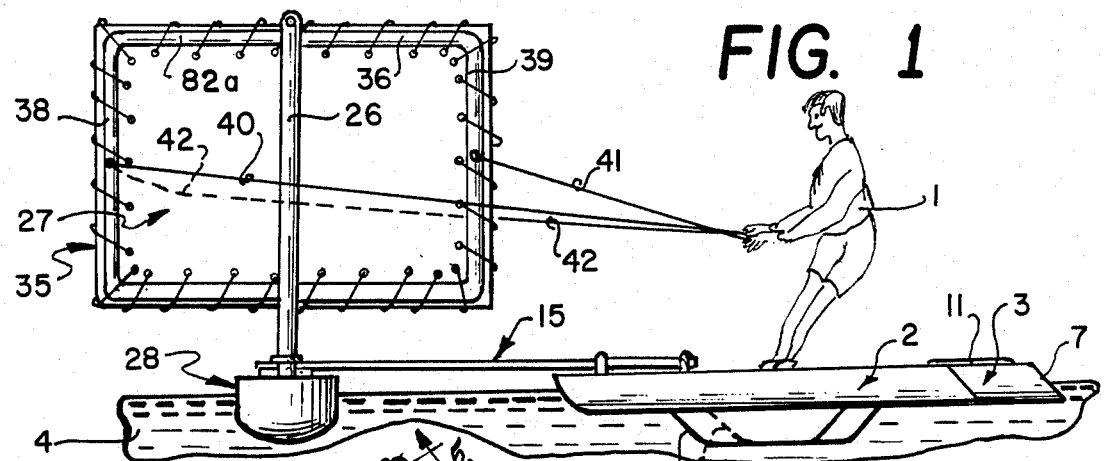
FIG. 1 is a side elevational view of a wind propelled water transport device constructed according to the teachings of the present invention.
Figure 2:
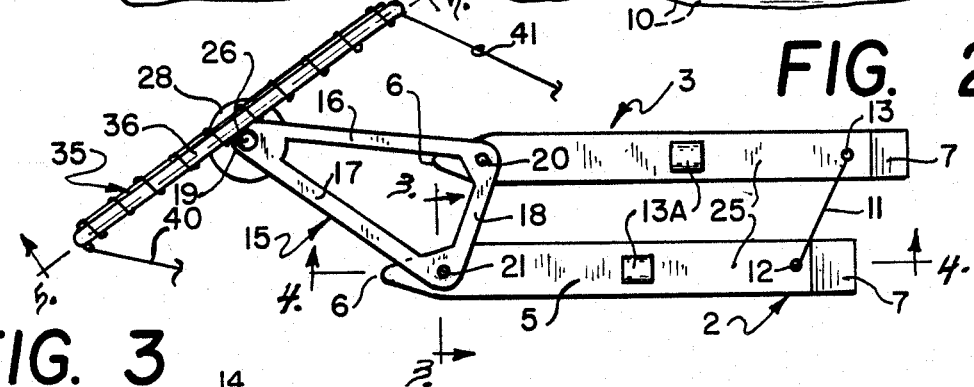
FIG. 2 is a plan view of the device of FIG. 1, the operator having been removed for clarity.
Figure 3:
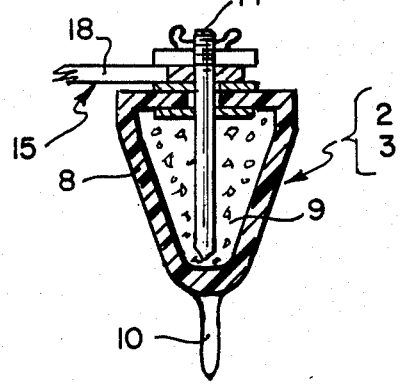
FIG. 3 is a sectional view taken along the line 3—3 of FIG. 2.
Figure 12:
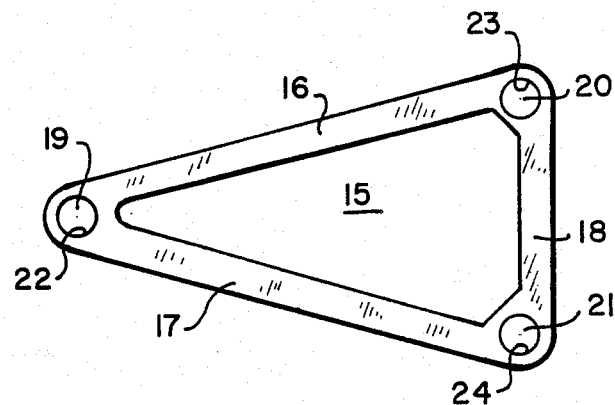
FIG. 12 is a plan view of the yoke utilized in all embodiments.
Figure 4:
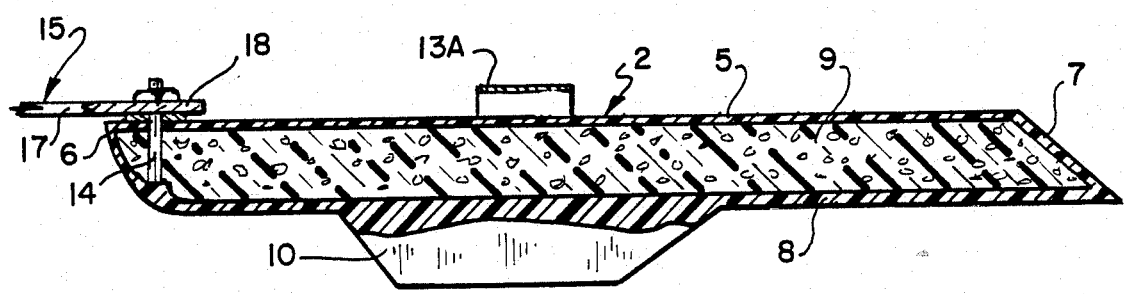
FIG. 4 is a sectional view taken along the line 4—4 of FIG. 2.

FIGS. 1 through 5 illustrate a wind propelled device in which the operator 1 stands upon a pair of skids in the form of elongated floating skis or pontoons 2 and 3, the sailor or operator having one foot on each of the pontoons. The pontoons 2 and 3 are sufficiently buoyant to fully support the operator 1 on a body of water 4.

The pontoons 2 and 3 have an upper surface 5 which is preferably flat to accommodate the feet of the operator. The pontoons 2 and 3 are shaped to facilitate movement through the water and have a pointed front end 6 which tapers downwardly into the body of water 4, and a downwardly tapering back end 7. The pontoons 2 and 3 are formed of an outer shell 8 and may contain a mass 9 of foam plastic disposed within the shell to provide rigidity to the shell and help seal the shell against water leakage. Each of the pontoons 2 and 3 is provided with a flat fin 10 extending downwardly from and normal to the surface 5 into the body 4 of water. Each fin 10 is located between the front end 6 and the back end 7 of one of the pontoons 2 or 3. These fins 10 provide the function of a keel or centerboard.

The figures are also illustrated a link in the form of an elongated bar or strand 11 pivotally mounted at its ends on posts 12 and 13 mounted on the pontoons 2 and 3, respectively. The invention may be practiced omitting the bar 11 and the posts 12 and 13. Further, the bar 11 may be rigid or stretch in length. A link of fixed length is easier to handle but less efficient. The flexible link is more difficult to manage, but more challenging.

The upper surface 5 of the pontoons 2 and 3 is preferably provided with a non-skid surface to facilitate the firm placement of the feet of the operator on the pontoons and thereby control the movement of the apparatus. Each ski 2 and 3 may also be provided with a foot strap 13A to secure the operator's feet on the skis in the discretion of the operator. The operator places one foot on each of the pontoons 2 and 3, and the operator's feet will shift the pontoons 2 and 3 with respect to each other forward and backwards in the course of sailing the apparatus, including tacking from one direction to another, compensating for the direction and strength of the wind, and directing the apparatus in the desired direction of travel.

Figure 10:
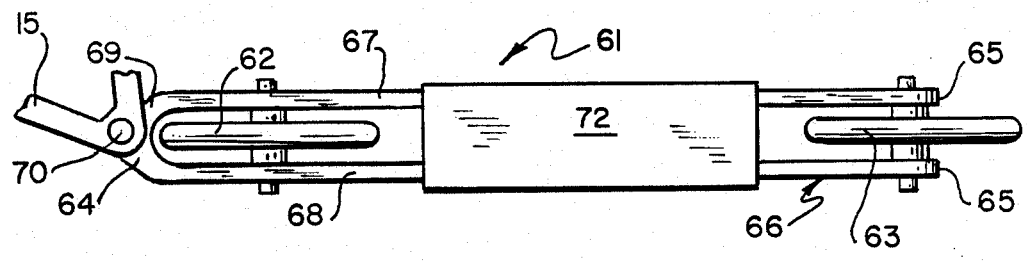
FIG. 10 is a plan view of the wheeled device of FIG. 9.

A pin 14 extends through the shell 8 of each of the pontoons 2 and 3 adjacent to the front end 6. The pins 14 are the means for coupling the front ends of the pontoons 2 and 3 to a flat yoke 15 which is illustrated in FIG. 10. The yoke 15 has three arms 16, 17 and 18, the arms 16 and 17 being of the same length and interconnected at one end by a corner portion 19. The other ends of the arms 16 and 17 are interconnected by the arm 18 at the corner portions 20 and 21, respectively. The interconnecting corner portions 19, 20 and 21 are provided with apertures 22, 23 and 24. The pin 14 at the front of pontoon 2 is journaled within the aperture 24 of the yoke 15, and the pin 14 of pontoon 3 is journaled within the aperture 21 of the yoke 15, whereby the pontoons 2 and 3 are free to rotate on the pins 14. The aperture 22 in the corner portion 19 accommodates a hollow cylinder 25 and the yoke 15 is securely fastened to the cylinder 25 as illustrated in FIG. 5. The cylinder 25 receives a mast 26 for supporting a sail 27, and the bottom end of the cylinder 25 is surrounded by a float 28 that supports the mast 26.

The float 28 is a solid ball 29 of plastic foam material. In the construction illustrated in FIG. 5, the ball 29 is provided with a protective outer shell 30 with a disc portion 31 forming a flat upper surface and a cup shaped lower portion 32. The hollow steel shell is water tight and may be utilized without the plastic foam ball 29. Either will provide the buoyancy to support the mast 26 and sail 27 on the surface of the body of water 4. The hollow cylinder 25 extends through the float 28 and is firmly attached to it and sealed against water leakage.

The cylinder 25 extends from the bottom of the float 28 upwardly to provide a continuous linear channel of cylindrical shape for accommodating one end of the mast 26. The mast 26 is provided with a collar 33 which extends outwardly from the mast, and the collar 33 abuts the upper end of the cylinder 25.

The collar 33 is firmly attached to the mast 26 and rests upon the top of the hollow cylinder 25 when the mast is inserted into the cylinder, and holds the mast at the proper height so that the end of the mast 26 extends just about one inch below the bottom of the flaot 25. The mast 33 fits loosely within the hollow cylinder 25 and therefore rotates freely in the cylinder, thus allowing the mast and sail to be positioned at any desired angle for sailing by the operator.

In the particular construction shown in FIGS. 1 through 5, it is not necessary for the float 28 to be rotatable with respect to the yoke 15, since the float 28 has a symetrical surface of revolution about the axis of the mast 26, the outer shell 30 being cylindrical, thereby permitting the float to move in any direction with respect to the water. If however the float is linear in form, or is provided with a fin to require the float to become oriented in a particular direction parallel to the direction of motion of the pontoons 2 and 3 with respect to the water, it is necessary for the cylinder 25 to be rotatable within the aperture 22 of the yoke 15.

It should be understood that the invention may be practiced with a mast 26 securely fastened in a nonpivotable manner to the yoke 15. In this case, the sail will be attached on the mast 26 in a manner such that it can be rotated through an arc of about 200 degrees independently of the mast in order to fulfill its sailing function. The construction illustrated is however structurally simpler and preferred.

The sail 27 may be of any shape, but is preferably rectangular, as illustrated. The sail 27 is mounted on a rectangular frame 35. The frame 35 has an upper yard 36 centrally mounted on the upper portion of the mast 26 in a fixed nonrotatable manner by conventional means. The frame 35 also has a lower cross arm 37 and side members 38 and 39. Lines 40, 41 and 42 are attached centrally of the side members 38 and 39. Lines 40 and 41 are attached to either side of the side member 38 at the front of the frame. The line 42 is attached to the side member 39 at the rear of the frame, and the lines extend to the operator 1. As a result, the operator 1 manipulates the lines to provide proper wind action on the sail 27, but also transfers a portion of the force of the wind on the sail through the lines 40, 41 and 42 to the pontoons 2 and 3, thereby providing propulsion. The remainder of the force transferred from the sail to the skis is transferred through the mast 26 and the yoke 15. For this reason, the rectangular rigging is considered superior to the types of sails, such as the floating boom and triangular sail construction, although such constructions may be used with the present invention.

FIG. 6 illustrates a modified construction of the wind propelled water transport device of FIGS. 1 through 5. The pontoon 2 has been replaced with the pontoon 43, and the pontoon 3 has been replaced with the pontoon 44. The pontoons 43 and 44 are identical to the pontoons 2 and 3, respectively, except that they are provided with a plurality of parallel slats 45 which extend between the pontoons 43 and 44. Each of the slats 45 is pivotally mounted on the pontoon 43 at one end by pins 46 which are anchored in the pontoon 43 along a straight line at equally spaced intervals. The other end of each of the slats 45 is pivotally mounted on the pontoon 44 by pins 47 which are anchored on the pontoon 44 along a straight line at equal intervals. Since the slats 45 are pivotally mounted on the pins 46 and 47, the pontoons 43 and 44 may be translated with respect to each other but will remain parallel to each other under all positions. This permits the operator to advance one of the corners of the yoke 15 with respect to the other, thereby moving the mast with respect to the pontoons 43 and 44.

FIG. 7 illustrates a skateboard 48 which may be substituted for the pontoons 2 and 3 of the embodiment of FIGS. 1 through 5. The skateboard 48 has a flat elongated plank 49 with an upper surface 50 and a lower surface 51. A wheel 52 is disposed at the rear end 53 of the skateboard 48, and a second wheel 54 is mounted adjacent to the forward end 55 of the skateboard 48. The front wheel 52 is fixed in parallel relation to the axis of the plank 49. The back wheel 54 may be fixed with respect to the plank 49 or can function as a caster, reacting to the movement of the skateboard 48 in relation to the direction of the ground over which it is moving. The plank 49 carries a pin 56 adjacent to its forward end 55 for attachment at socket 20 or 21 of the yoke 15.

A yoke 15, mast 26 and sail 27, as illustrated in the embodiment of FIGS. 1 through 5, are attached to the front ends 55 of the skateboards 48 through the pin 56 arranged like that in FIGS. 1 through 5. However, the float 28 that is shown in FIGS. 1 through 5 is replaced by a caster wheel 57, as illustrated in FIG. 8, which is mounted on and supports the mast 26 and sail 27, and which can rotate with respect to the mast 26 and to the ground upon which it rides. The caster wheel 57 is mounted on a stem 58 by a fork 59, and the stem 58 carries a flange 60 which supports the corner 19 of the yoke 15. The stem 58 is journaled within the lower hollow end of the mast 26. It is optional whether a connection link is placed between the back ends of the skateboards. The movement of the boards will align them without the need for any rear connecting link.

Figure 9:
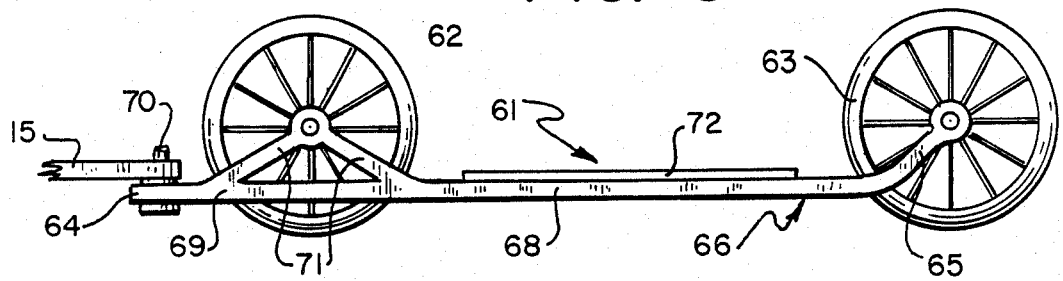
FIG. 9 is a side elevational view of a wheeled apparatus which is a modification of the device of FIG. 7 and utilizes the yoke, mast and sail of FIGS. 1 through 5.

FIGS. 9 and 10 illustrate a wheeled device 61 which may be substituted for the skateboard 48 illustrated in FIGS. 7 and 8. Two wheels 62 and 63, of significantly greater diameter than the wheels 52 and 54 of the skateboard, are mounted at the front end 64 and back end 65, respectively, of a frame 66. The frame 66 has a pair of elongated parallel rails 67 and 68 which extend from an integral U-shaped portion 69 disposed at the front end 64 of the device. A pin 70 is mounted on the U-shaped portion 69 of the frame 66 and engages aperture 20 or 22 of the yoke 15 to couple the wheeled device to the sail 27.

One wheel 62 is coupled to the frame 66 adjacent to the front end 64, and the other wheel 63 is journaled on the frame 66 adjacent to the back end 65. The rails 67 and 68 are disposed below the axes of the wheels 62 and 63, and curve upwardly to the axle of wheel 63 at the back end 65 of the frame 66. The rails 67 and 68 are provided with upwardly extending brackets 71 adjacent to the front end 64 of the frame 66, and the wheel 62 is journaled on the brackets 71. A plank 72 is mounted on the upper side of the rails 67 and 68 between the wheels 62 and 63 to support one foot of the operator.

The structure illustrated in FIGS. 1 through 5 may also be adapted for use on snow or ice by means of skis 73 as illustrated in FIG. 11. Skis 73 take the place of the pontoons 2 and 3 of FIGS. 1 through 5. Each ski 73 has a flat elongated body 74. The ski also has a bottom surface 75 which is flat and adapted to ride upon snow. The ski 73 has a forward end 76 and a rearward end 77, and the forward end tapers upwardly at 78. A flat lip 79 is disposed between the upwardly tapering portion 78 and the forward end 76, and carries a pin 80 disposed between disc portions 81 and 82. A pair of skis 73 are utilized, the pin 80 of one ski being connected to the socket 20 of the yoke 15 and the pin 80 of the other ski being connected to the socket 21 of the yoke 15.

Those skilled in the art will recognize advantages of the present invention beyond those disclosed in the foregoing specification, and will recognize uses for the present invention over and above those set forth herein. It is therefore intended that the scope of the present invention be not limited by the foregoing specification, but rather only by the appended claims.

The invention claimed is:

1. A wind propelled apparatus comprising, in combination: an elongated mast having a first central axis extending from one end to another end adapted to support a sail and having means at the one end for translatably supporting the mast on the surface of the earth, means for supporting an operator including a pair of elongated skids adapted to be translated along the axes of elongation thereof from a forward end to a trailing end on the surface of the earth, means including a yoke for maintaining the mast generally vertically on an axis displaced from the pair of skids, the yoke having a first arm and a second arm, means connecting the one ends of the first arm and second arms on the mast, the first and second arms extending from the mast at a fixed angle with respect to each other, means mounted on one of the skids adjacent to the forward end thereof for connecting the other end of the first arm on the skid for rotation about a second axis, means mounted on the other skid adjacent to the forward end thereof for connecting the other end of the second arm on the other skid for rotation about a third axis, the first, second and third axes being generally parallel to each other and disposed in fixed positions at the corners of a triangle with the first axis disposed forwardly of the pair of skids.

2. A wind propelled apparatus comprising in combination: a mast having a first central axis adapted to support a sail, means for mounting the mast generally vertically comprising a float mounted on the mast at one end thereof, a first arm and a second arm, means operatively associated with one end of the first and second arms for connecting the arms on the mast, a first and a second elongated ski disposed parallel to each other, each of said skis having an upper surface and an opposite surface, means mounted on the first ski for connecting the other end of the first arm on the first ski for rotation about a second axis, the second ski being connected to the other end of the second arm, the second being rotatable with respect to the second ski about a third axis, the axis of the mast, the second rotational axis and the third rotational axis being disposed parallel to each other and at the corners of a triangle, a plurality of parallel slats, each slat being pivotally attached at one end to the first ski and pivotally attached at the other end to the second ski, the first arm being pivotally attached to the first ski and the second arm being pivotally attached to the second ski, and the first and second skis being translatable with respect to each other.

3. A wind propelled apparatus comprising the combination of claim 1 wherein the pair of skids comprises skis.

4. A wind propelled apparatus comprising the combination of claim 3 in combination with a third arm connected between the second pivotal axis and the third pivotal axis.

5. A wind propelled apparatus comprising the combination of claim 3 wherein the first and second skis are constructed of buoyant material and are adapted to supported the operator on a body of water.

6. A wind propelled apparatus comprising the combination of claim 5 wherein the first and second skis have a top side, and a bottom side, each ski being provided with a fin extending outwardly from the bottom side thereof parallel to the axis of elongation of the ski.

7. A wind propelled apparatus comprising the combination of claim 3 wherein each ski has a top side adapted to support an operator and a bottom side, and the bottom side being substantially flat and adapted to ride on snow.

8. A wind propelled apparatus comprising the combination of claim 1 where each skid comprises an elongated skateboard.

9. A wind propelled apparatus comprising the combination of claim 8 in combination with a third arm connected between the second pivotal axis and the third pivotal axis.

10. A wind propelled apparatus comprising: in combination, a mast having a central axis of elongation adapted to support a sail, means for mounting the mast generally vertical including a pontoon mounted on the mast at one end thereof and a planar yoke having first, second, and third sockets, the first socket being equally spaced from the second and third sockets and the sockets being disposed on axes forming an isosceles triangle, the sockets having channels disposed normal to the plane of the yoke, the first socket accommodating and engaging the mast, a pair of skis having a central axis of elongation extending between a front end and a rear end, the skis having an outer watertight shell defining an upper and lower surface and being adapted to float on water and support an operator on the upper surface thereof, each of said skis having a pin mounted on the ski adajcent to the forward end and extending outwardly from the upper surface thereof, the pin of the first ski being rotatably mounted in the second socket of the yoke and the pin of the second ski being rotatably mounted in the third socket of the yoke, whereby the mast is positionable along an arc forwardly of the skis.

11. A wind propelled apparatus comprising the combination of claim 10 wherein each ski is provided with a means on its upper surface for securing one foot of the operator on said ski.

12. A wind propelled apparatus comprising the combination of claim 10 wherein each ski has a flat fin extending outwardly from the lower surface of the shell parallel to the axis of elongation of the ski.

13. A wind propelled apparatus comprising the combination of claim 1 or 10 in combination with a yard carried centrally by the mast adjacent to the other end thereof and a sail depending from the yard, lines coupled to opposite sides of the sail adapted to be manned by the operator.

14. A wind propelled apparatus comprising the combination of claim 13 wherein the yard comprises the upper portion of a rectangular frame mounted on the mast, the sail being mounted on the rectangular frame and being supported by the frame, the lines being attached to opposite sides of the frame.

* * * * *